United States Patent
Naveen et al.

(10) Patent No.: US 6,243,495 B1
(45) Date of Patent: Jun. 5, 2001

(54) METHOD A GROUP OF PICTURE STRUCTURE IN MPEG VIDEO

(75) Inventors: Thumpudi Naveen; Ali Tabatabai, both of Beaverton; Radu S. Jasinschi, Hillsboro, all of OR (US)

(73) Assignee: Grass Valley (US) Inc., Nevada City, CA (US)

( * ) Notice: Subject to any disclaimer, the term of this patent is extended or adjusted under 35 U.S.C. 154(b) by 0 days.

(21) Appl. No.: 09/023,805

(22) Filed: Feb. 13, 1998

(51) Int. Cl.$^7$ .............................. G06K 9/36; H04N 7/12; H04B 14/06
(52) U.S. Cl. ........................... 382/236; 348/416; 375/245
(58) Field of Search .................................... 382/236, 238, 382/232; 248/416, 390, 459, 415, 405, 409, 699, 394, 401, 446, 402, 452; 375/245, 243; 341/61, 50; 386/111

(56) References Cited

U.S. PATENT DOCUMENTS 5,537,440 * 7/1996 Eyuboglu et al. ................... 375/245
5,940,130 * 8/1999 Nilsson et al. ...................... 348/416

* cited by examiner

*Primary Examiner*—Thomas D. Lee
*Assistant Examiner*—Wenpeng Chen
(74) *Attorney, Agent, or Firm*—Kenyon & Kenyon

(57) ABSTRACT

A method of modifying a group of pictures (GOP) structure in an MPEG video signal from a low-delay mode bitstream having I and P pictures to a non-low-delay bitstream having I, P and B pictures uses the motion vectors from the low-delay mode bitstream to derive the motion vectors for the non-low-delay mode bitstream. Motion vectors for anchor pictures for the non-low-delay mode bitstream are converted from the motion vectors for the corresponding pictures in the low-delay mode bitstream. Motion vectors for the B pictures in the non-low-delay mode bitstream are converted from the motion vectors for the corresponding P pictures in the low-delay mode bitstream. The converted motion vectors for the non-low-delay mode bitstream are used in recoding an uncompressed video signal derived from the low-delay mode bitstream to produce the non-low-delay mode bitstream.

6 Claims, 2 Drawing Sheets

METHOD A GROUP OF PICTURE STRUCTURE IN MPEG VIDEO

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to video compression, and more particularly to modifying a group of picture structure in MPEG video.

The Motion Picture Engineering Group (MPEG) has established various standards for the compression of television video and audio information. One standard is referred to as MPEG-2. This standard has three different compressed picture types: I, P and B. MPEG-1 permitted a fourth compressed picture type: D for DC-only pictures. The D picture type is available in MPEG-2 only in pure MPEG-1 mode. The I pictures represent a stand alone image, i.e., the pictures are compressed solely with respect to the information within the picture without reference to any other pictures. The P pictures are composed of macroblocks which may be either intra-coded, as in the I pictures, or based on prediction from a previous I or P picture. The B pictures are composed of either intra-coded macroblocks or forward, backward or bi-directionally predicted blocks. The reference pictures for B picture prediction are the closest I or P pictures on either temporal side. These reference pictures are referred to as anchor pictures. When coded, the sequence of pictures is IBBPBBP . . . I, as shown in display order in FIG. 1. In order to make sure that the coded bitstream contains only causal references, the coded picture order for the above display sequence of pictures is IPBBPBB . . . I. Informally a group of pictures (GOP) defines the periodicity of the picture types in the coded bitstream. GOPs are often parameterized by the two numbers M and N, as indicated in FIG. 1. M is the periodicity of P pictures and N is the periodicity of I pictures. For example, as shown M=3 and N=15.

The GOP structure provides tradeoff flexibility for an encoder in terms of compression factor, complexity and latency. For example, MPEG-1 and MPEG-2 video compressors typically take as input a standard definition raw digital video bitstream at up to 286 Mb/s and generate a compressed bitstream with a bit-rate ranging anywhere from 0.5 Mb/s to 50 Mb/s. The compression factor is defined as the ratio between the raw data input rate and the compressed data output rate. Likewise complexity refers to the complexity in hardware/software implementation—gate/transistor count and speed of execution in hardware, and lines of code and number of operations to achieve a task in software. Finally latency for this purpose is end-to-end latency in a video compressor, transmission medium and video decompressor system which indicates the time interval between the instance a frame or picture is captured by a camera and fed to the video compressor and the instance that same frame or picture is decompressed and displayed from the video decompressor. Generally with increased implementation complexity or more latency better compression factors are obtainable. The higher the latency the greater the complexity.

In teleconferencing applications the latency requirements are stringent, and the overall end-to-end latency in a video compressor, transmission and video decompressor system should be only a fraction of a second, such as less than or equal to 250 milliseconds. In these applications it is quite normal to use a GOP structure having mainly P pictures and periodic I pictures to perform a refresh. This mode of operation is usually termed a low-delay mode. A typical GOP structure for low-delay mode in the 60 Hz world is M=1, N=15, and in the 50 Hz world is M=1, N=12. With such a GOP structure the amount of memory needed at the compressor and decompressor is very small. The motion estimation complexity at the encoder also is very small compared to the motion estimation for B pictures. However the compression achievable with such a GOP structure is inferior to the compression achievable with B pictures.

In most other applications the compression factor is of greater importance. In such applications B pictures are used for higher compression. This mode of operation is usually termed a non-low-delay mode. A typical GOP structure for these applications in the 60 Hz world is M=3, N=15, and in the 50 Hz world is M=3, N=12. These GOP structures provide a good compromise between latency, compression factor and complexity.

The compressed video bitstream generated for interactive teleconferencing applications may have to be stored, or archived, for future reviews. To enable this, the compressed video bitstream in the low-delay mode needs to be converted to a non-delay-mode compressed video bitstream, such as by decompressing and recompressing. Another reason for generating the non-delay-mode bitstream from the low-delay mode bitstream may be lack of motion estimation resources at the encoder for full B picture estimation. The straightforward approach is to decompress the low-delay mode video bitstream into an uncompressed raw video bitstream, and to perform a new compression in non-low-delay-mode. In this approach the motion information available in the low-delay mode bitstream is ignored, or forgotten, and the motion estimation is performed by the encoder on the video bitstream again. This results in wastage of resources.

What is desired is a method of modifying a GOP structure from low-delay mode to non-low-delay-mode that uses the motion vector information present in the low-delay mode bitstream to generate the non-low-delay mode bitstream with a higher compression factor.

BRIEF SUMMARY OF THE INVENTION

Accordingly the present invention provides a method of modifying a group of picture (GOP) structure in MPEG video using motion vector information from a low-delay mode bitstream to convert to a non-low-delay mode bitstream to provide greater compression. First the anchor frames for the non-low-delay mode bitstream are converted from the corresponding P pictures in the low-delay mode bitstream based upon a new preceding frame upon which the prediction is based. Then the remaining P pictures in the low-delay mode bitstream are converted into B pictures for the non-low-delay mode bitstream. Both conversion steps make use of the motion vector information from the low-delay mode bitstream to create motion vector information for the non-low-delay mode bitstream. The low-delay mode bitstream is uncompressed by a video decompressor, and the raw uncompressed video bitstream is forwarded together with the converted non-low-delay mode motion vectors to a video compressor for recoding in the non-low-delay mode.

The objects, advantages and other novel features of the present invention are apparent from the following detailed description when read in conjunction with the appended claims and attached drawing.

DETAILED DESCRIPTION OF THE INVENTION

The only MPEG picture types allowed in a low-delay mode bitstream are I and P. The picture types and numbers in display order in a first GOP of the low-delay mode bitstream are:

$$I_0P_1P_2P_3P_4P_5P_6P_7P_8P_9P_{10}P_{11}P_{12}P_{13}P_{14}(I_{15})$$

with $I_{15}$ belonging to the next GOP. For this low-delay mode bitstream the picture numbers in coding and display order are the same. The same video in non-low-delay mode with M=3 and N=15 in display order is:

$$I_0B_1B_2P_3B_4B_5P_6B_7B_8P_9B_{10}B_{11}P_{12}(B_{13}B_{14}I_{15})$$

with $B_{13}B_{14}I_{15}$ belonging to the next GOP. In bitstream coding order however the sequence is represented as:

$$I_0P_3B_1B_2P_6B_4B_5P_9B_7B_8P_{12}B_{10}B_{11}(I_{15}B_{13}B_{14})$$

The P pictures in the low-delay mode that become anchor pictures in the non-low-delay mode remain P pictures. However, the anchor picture from which these P pictures are predicted is different in the two bitstreams. For example $P_3$ in the low-delay mode bitstream is predicted from $P_2$, while in the non-low-delay mode bitstream it is predicted from $I_0$. This is one conversion that needs to be made for converting from a low-delay mode to a non-low-delay mode bitstream, called converting anchor pictures. A number of other P pictures in the low-delay mode bitstream need to be converted to B pictures, such as $P_1P_2P_4P_5P_7P_8P_{10}P_{11}P_{13}P_{14}$. This is a second conversion that needs to be made, called converting into B pictures.

For the purpose of the following discussion, only frame structured pictures are considered so that only a frame-based motion compensation is performed, and no dropping of pictures is assumed. However this methodology may be extended to field structured pictures, and to field and dual-prime motion compensation modes. In the motion compensated macroblocks for frame-based prediction, one motion vector per macroblock per reference or anchor picture exists. The motion vector indicates where a particular macroblock, a 16×16 pixel region, in a current picture originated from in the reference or anchor picture. Macroblocks in the following discussion are in the form MB(row,column) where row and columns are in increments of 16. The motion vector for MB(x,y) in picture m based on the anchor picture n is $V_{(m,n,x,y)}$ with two components—a horizontal component $VX_{(m,n,x,y)}$ and a vertical component $VY_{(m,n,x,y)}$. Then the prediction for MB(x,y) in picture m based on picture n is given by the 16×16 block with top-left corner at $(x+VX_{(m,n,x,y)}, y+VY_{(m,n,x,y)})$. These motion vectors have a resolution of one-half pixel.

Converting Anchor Pictures

Figure 3:
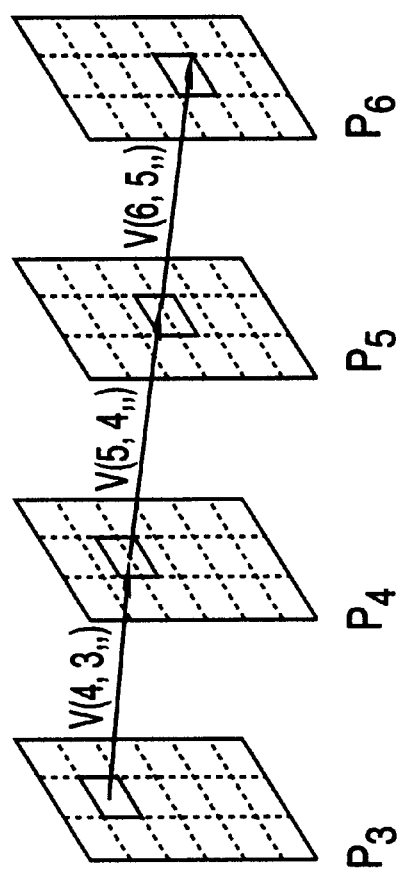
FIG. 3 is a pictorial illustration of the motion vector information for a low-delay mode bitstream.
Figure 4:
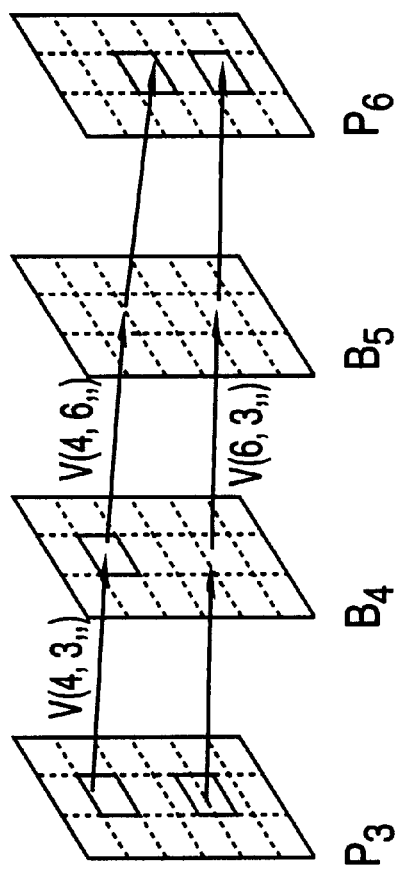
FIG. 4 is a pictorial illustration of the motion vector information for a non-low-delay mode bitstream according to the present invention.

Referring now to FIGS. 3 and 4 if a macroblock in a P picture is motion compensated, it has a motion vector pointing to a 16×16 region in the preceding picture. This 16×16 region need not be aligned with the macroblock grid, shown as dotted lines. The goal is to modify the motion vectors in $P_6$ so that they refer to $P_3$ rather than $P_5$. In other words from the information at all (x,y) on $V_{(6,5,x,y)}$, $V_{(5,4,x,y)}$ and $V_{(4,3,x,y)}$ the vector $V_{(6,3,x,y)}$ is computed.

One approach to obtain the approximate values of the required motion vectors is to use the following procedure:

```
for (int y=0; y<picture height; y+=16) {//loop 1
    for (int x=0; x<picture width; x+=16) {//loop 2
        int x1=x; int x2=x;
        int y1=y; int y2=y
        for (int test=6; test<=4; test--) {//loop 3
            int ref=test-1;
            if (MB(x1,y1) is intra) break;
            x2+=VX(test,ref,x1,y1);
            y2+=VY(test,ref,x1,y1);
            Next find the macroblock location (x1,y1) in
            picture "ref" that has the maximum overlap
            with the 16x16 block at (x2,y2) in picture
            "ref".
        } //loop 3
        VX(6,3,xy)=x2-x; Vy(6,3,x,y)=y2-y
    } //loop 2
} //loop 1
```

Loop 1 visits all macroblock rows in a picture that needs to be converted, and loop 2 visits all macroblocks in a row of macroblocks. For a given macroblock in $P_6$ shown in FIG. 3 loop 3 first finds the best corresponding 16×16 region in $P_5$, then finds the best corresponding 16×16 region in $P_4$ for the region found in $P_5$, and finally finds the best corresponding 16×16 region in $P_3$ for the region found in $P_4$. Thus loop 3 finds the best corresponding 16×16 region in $P_3$ for the macroblock under consideration in $P_6$ to define the output motion vector. In the process of "guessing" the correspondence the motion vectors available for $P_6$, $P_5$ and $P_4$ are consulted, stepping through the pictures in the direction of the motion vectors.

If motion estimation resources are available at an encoder, the encoder may 1) refine the velocity vectors obtained from above, and/or 2) use a weighted average of neighboring macroblock (proportional to overlap area) motion vectors in the above rather than a single motion vector per macroblock.

Converting to B Pictures

To convert the $P_4$ picture into the $B_4$ picture from the information at all (x,y) on $V_{(6,5,x,y)}$, $V_{(5,4,x,y)}$ and $V_{(4,3,x,y)}$, $V_{(4,3,x,y)}$ and $V_{(4,6,x,y)}$ are computed. One approach to obtain the approximate values of the required motion vectors for picture "cur", where "cur" is either picture number 4 or 5 in the example shown, is the following:

```
for (int y=0; y<picture height; y+=16) { //loop 1
    for (int x=0; x<picture width; x+=16) { //loop 2
        //forward motion vectors
        int x1=x; int x2=x;
        int y1=y; int y2=y;
        for (int test=cur; test<=4; test--) { //loop 3
            int ref=test-1;
            if (MB(x1,y1) is intra) break;
            x2+=VX(test,ref,x1,y1);
            y2+=VY(test,ref,x1,y1);
            Next find the macroblock location (x1,y1) in
```

-continued

```
    picture "ref" that has the maximum overlap
    with the 16×16 block at (x2,y2) in picture
    "ref"
} //loop 3
VX(cur,3,x,y)=x2-x; VY(cur,3,x,y)=y2-y;
// backward vectors
int x1=x; int x2=x;
int y1=y; int y2=y;
for (int test=cur; test<=5; test++) { //loop 4
    int ref=test+1;
    Next find the macroblock location (x1,y1) in
    picture "ref" such that the 16×16 block at
    (x1+VX(ref,test,x1 ,y1),y1+VY(ref,test,x1,y1)
    has the maximum overlap with the 16×16
    block at (x2,y2) in picture "test".
    x2-=VX(ref,test,x1,y1);
    Y2-=VY(ref,test,x1,y1);
} //loop 4
VX(cur,6,x,y)=x2-x: VY(cur,6,x,y)=y2-y;
    } //loop 2
} //loop 1
```

For "cur"=4 $P_4$ is converted into $B_4$, and for "cur"=5 $P_5$ is converted into $B_5$. For the example of "cur"=4 loop 1 visits all macroblock rows in picture 4 and loop 2 visits all macroblocks in a row of macroblocks. For a given macroblock in picture 4 loop 3 finds the best corresponding 16×16 region in picture 3 which defines the forward motion vector. No "guesses" are needed as the velocity vectors are already available in $P_4$. For converting $P_5$ into $B_5$ the motion vectors available with $P_5$ and $P_4$ are consulted in loop 3. For a given macroblock in picture 4 loop 4 finds the best corresponding 16×16 region in picture 5, and then finds the best corresponding 16×16 region in picture 6 for the region found in picture 4. Thus loop 4 finds the best corresponding 16×16 region in picture 6 for the macroblock under consideration in picture 4 which defines the backward motion vector. In the process of "guessing" the correspondence the motion vectors available with $P_5$ and $P_6$ are consulted, and the pictures are stepped through in "reverse" motion vector direction.

An alternative to loop 4 of the B picture conversion procedure described above is a linear approach which is simpler and gives good results for shorter sub-GOPs—where the non-low-delay mode is M=2 and N=15 ($I_0B_1P_2B_3P_4B_5P_6$ . . . ), for example. To transform $P_3$ in the low-delay mode into $B_3$ in the non-low-delay mode:

1. Determine the macroblock displacements between $P_2$ and $P_4$.
2. Determine the macroblock displacements of $B_3$.
3. Adjust the macroblock displacements of $B_3$ to that of the regular macroblock grid.

The macroblock displacements between $P_2$ and $P_4$ are given by the sum of the known macroblock displacements between $P_4$ and $P_3$, and $P_3$ and $P_2$. The procedure for obtaining $P_3$ from $P_4$ and $P_2$ from $P_3$ is described above in the anchor picture conversion procedure. The macroblock displacement of $B_3$ is realized by linear interpolation. If $VX_{(4,2,x,y)}$ and $VY_{(4,2,x,y)}$ are the horizontal and vertical components of the dislocation of the macroblock indexed by (x,y), then the corresponding macroblock displacement of $B_3$ is given by $VXB_{(3,2,x,y)}=VX_{(4,2,x,y)}/2$ and $VYB_{(3,2,x,y)}=VY_{(4,2,x,y)}/2$. The macroblock position adjustment is done by choosing the macroblock grid that has the largest number of pixels in common with the macroblock determined by $VXB_{(3,2,x,y)}$ and $VYB_{(3,2,x,y)}$ or to the weighted average proportional to the overlap area.

The above described method may be extended to the arbitrary GOP structure $I_0P_1$ . . . $P_{n-1}$. To transform the P pictures into B pictures, step 2 above is modified by using for the macroblock dislocations $VXB_{i(i,0,x,y)}=(n-i)VX_{(n,0,x,y)}/n$ and $VYB_{i(i,0,x,y)}=(n-i)VY_{(n,0,x,y)}/n$.

If motion estimation resources are available at the encoder, the encoder may 1) refine the velocity vectors obtained from above, and/or 2) use a weighted average proportional to the overlap area of the neighboring macroblock motion vectors in the above rather than a single motion vector per macroblock.

Recoding

Figure 1:
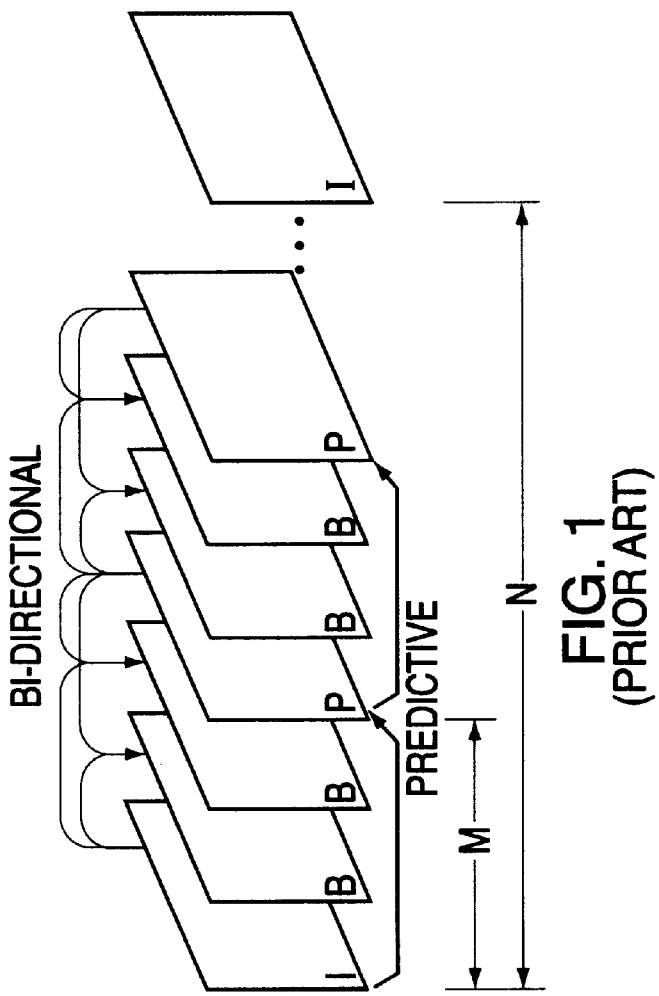
FIG. 1 is a pictorial representation of a sequence of MPEG picture types in display order.
Figure 2:
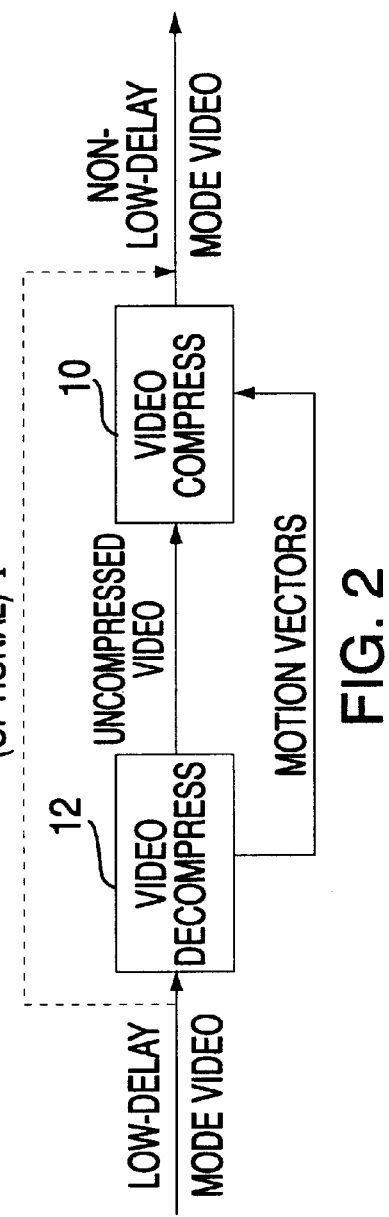
FIG. 2 is a block diagram view of a system for modifying a group of pictures structure according to the present invention.

Once the motion vectors for a sub-GOP have been obtained, i.e., for M number of pictures, recoding the video may be performed. With limited processing resources at a video compression block 10 shown in FIG. 2, the I pictures may be passed through unmodified from the low-delay mode bitstream. However if the resources are available in the video compression block 10, they are used to recompress the uncompressed video from a video decompression block 12 corresponding to the I pictures at a target bit rate. The video decompression block 12 provides an uncompressed raw video bitstream from the low-delay video bitstream as well as converted motion vectors to the video compression block 10 to produce the non-low-delay mode video bitstream. While coding the anchor P pictures, macroblock typing is performed to see which of the following is better for compression: 1) intra coding; 2) motion compensated with the motion vector obtained from the anchor picture conversion procedure described above; or 3) motion compensated with zero motion vectors. While coding the bidirectionally predicted B pictures, macroblock typing is performed to see which of the following is better for compression: 1) intra coding, 2) motion compensated forward motion vector obtained from the B picture conversion procedure described above; 3) motion compensated with the backward motion vector obtained from the B picture conversion procedure; or 4) motion compensated with both forward and backward motion vectors.

Thus the present invention provides a procedure for modifying a group of picture (GOP) structure in MPEG video in converting from a low-delay mode bitstream to a non-low-delay mode bitstream by converting anchor picture motion vectors for the low-delay mode into motion vectors for the anchor pictures in the non-low-delay mode, converting the motion vectors for intervening P pictures between anchor pictures into B picture motion vectors, and recoding the low-delay mode bitstream into the non-low-delay mode bitstream using the converted motion vectors.

What is claimed is:

1. A method of modifying a group of picture structure from a low-delay mode bitstream to a non-low-delay mode bitstream comprising:

converting motion vectors for pictures in the low-delay mode bitstream corresponding to anchor frames in the non-low-delay mode bitstream to motion vectors for anchor frames in the non-low-delay mode bitstream;

converting motion vectors for pictures in the low-delay mode bitstream corresponding to bidirectionally predicted pictures in the non-low-delay mode bitstream to motion vectors for bidirectionally predicted pictures in the non-low-delay mode bitstream; and recoding an uncompressed video derived from the low-delay mode bitstream into the non-low-delay mode bitstream using the motion vectors for anchor frames in the non-low-delay mode bitstream and motion vectors for bidirectionally predited pictures in the non-low-delay mode bitstream.

2. The method as recited in claim 1, wherein converting motion vectors for pictures in the low-delay mode bitstream corresponding to anchor frames comprises:

for each macroblock in each of the anchor frames, finding a best corresponding region in a prior picture using the motion vector for the corresponding picture in the low-delay mode bitstream;

finding a next prior picture by stepping through the pictures in the low-delay mode bitstream in a forward direction of the motion vectors for the low-delay mode bitstream pictures until the next prior picture is a prior anchor frame in the non-low-delay mode bitstream; and outputting resultant motion vectors as the motion vectors for the anchor frame in the non-low-delay mode bitstream.

3. The method as recited in claim 1, wherein converting motion vectors for pictures in the low-delay mode bitstream corresponding to bidirectionally predicted pictures comprises:

for each macroblock in each of the bidirectionally predicted picture, finding a forward motion vector based upon the motion vectors for the corresponding pictures in the non-low-delay mode bitstream in the forward motion vector direction until a prior anchor frame is reached;

for each macroblock in each of the bidirectionally predicted picture finding a backward motion vector based upon the motion vectors for the corresponding pictures in the non-low-delay mode bitstream in the backward motion vector direction until a next anchor frame in the bidirectionally predicted picture is reached.

4. The method as recited in claim 3, wherein finding a backward motion vector comprises:

determining macroblock displacements between pictures in the low-delay mode bitstream corresponding to anchor frames in the non-low-delay mode bitstream bracketing the bidirectionally predicted picture;

determining macroblock displacements for the bidirectionally predicted picture by linear interpolation of the macroblock displacements for the pictures in the low-delay mode bitstream; and adjusting the macroblock displacements for the bidirectionally predicted picture to that of a regular macroblock grid according to the macroblock in the bidirectionally predicted picture that has the largest number of pixels in common with the linearly interpolated macroblocks for the bidirectionally predicted picture.

5. The method as recited in claim 1, wherein recoding an uncompressed video comprises:

typing the macroblocks of each picture for the non-low-delay mode bitstream to determine a compression coding technique; and coding the pictures according to the determined compression coding technique and the converted motion vectors.

6. The method as recited in claim 5, further comprising passing through I pictures from the low-delay bitstream directly to the non-low-delay mode bitstream.

* * * * *